Patented May 6, 1930

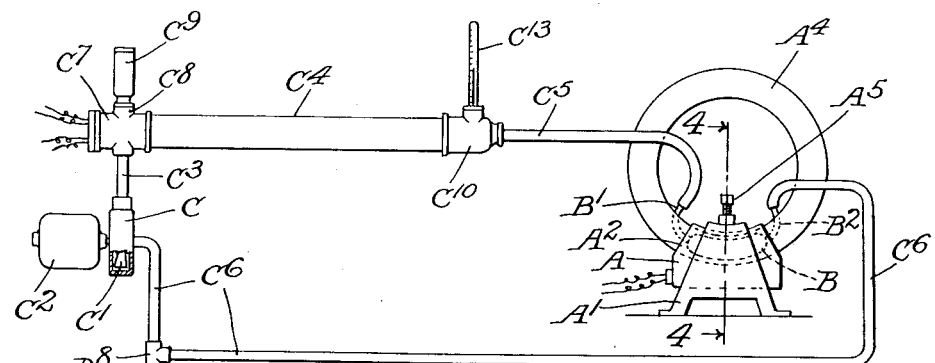
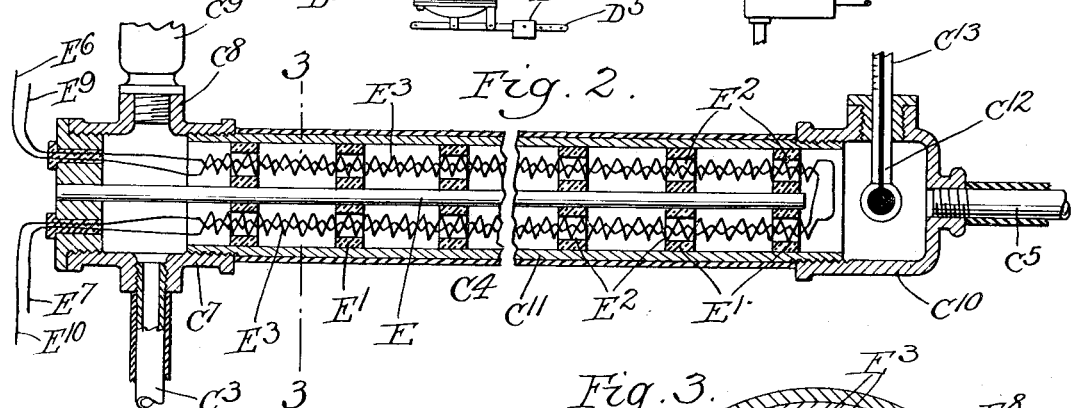
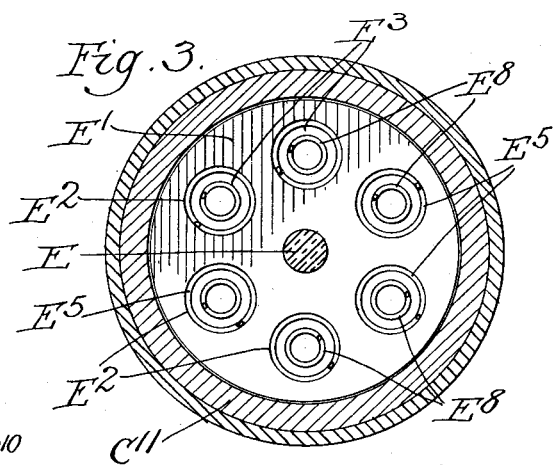
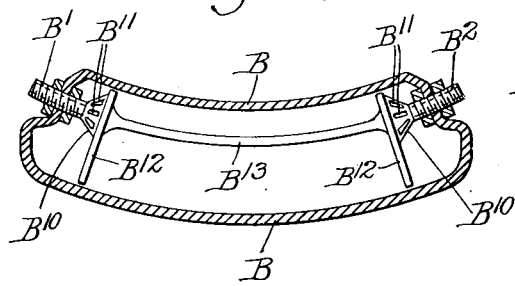

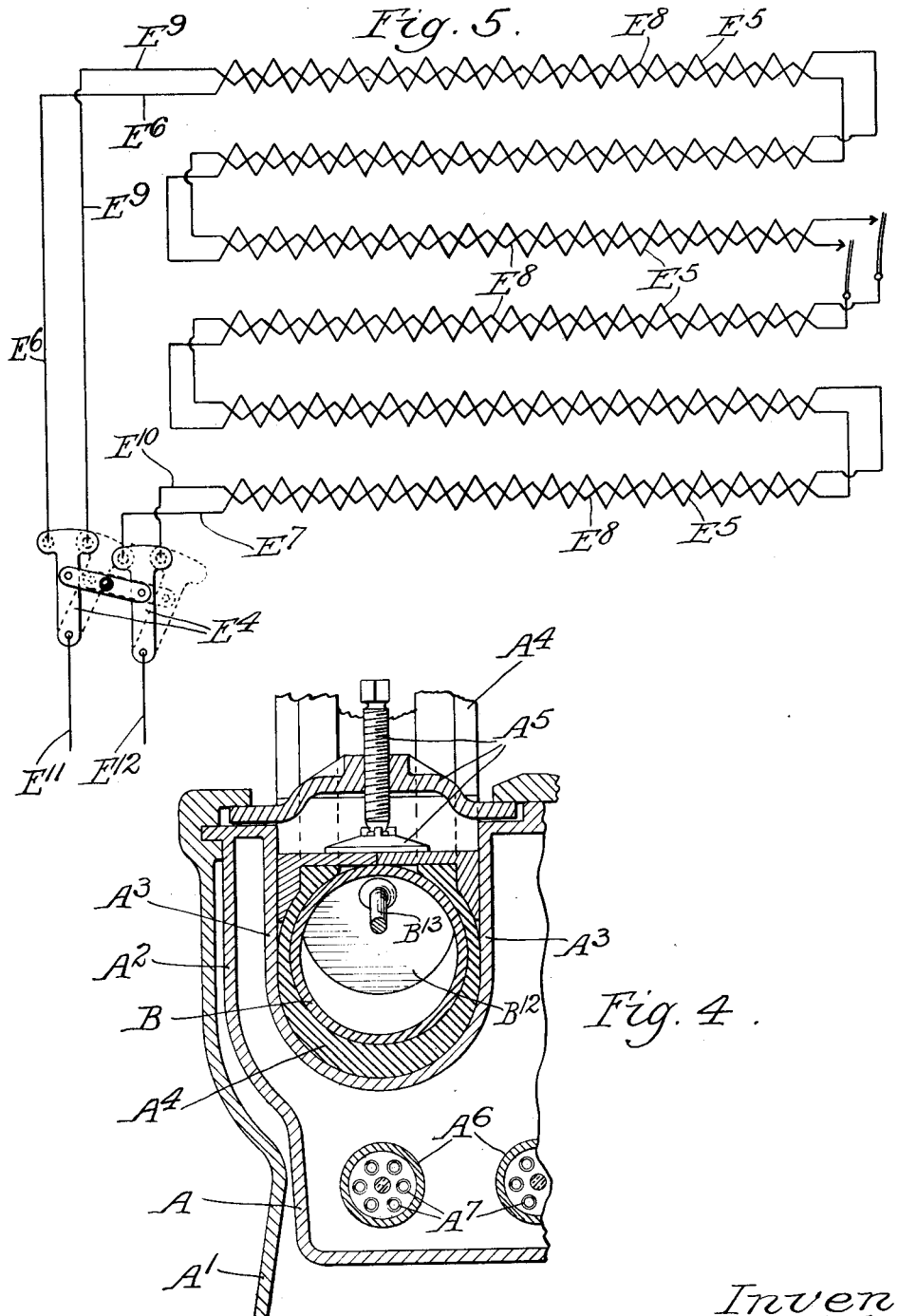

1,757,635

UNITED STATES PATENT OFFICE

WALTER J. JARRATT AND FRANK E. HARTMAN, OF CHICAGO, ILLINOIS

VULCANIZING APPARATUS

Application filed December 10, 1927. Serial No. 239,016.

Our invention relates to an apparatus for treating rubber articles and has for one purpose to provide means for heat treating or vulcanizing rubber tires or casings. Another object is to provide for the treating or vulcanizing of the interior of a tire or casing by the employment of a circulation of heated air or other gaseous or vaporous heat conducting media. Other objects will appear from time to time in the course of the specification and claim.

We illustrate our invention more or less diagrammatically in the accompanying drawings, wherein—

Figure 1 is a schematic view of the entire system;

Figure 2 is a longitudinal section through the air heating means;

Figure 3 is a section on the line 3—3 of Figure 2;

Figure 4 is a section on the line 4—4 of Figure 1;

Figure 5 is a wiring diagram of the heating element; and

Figure 6 is a longitudinal section through the heating bag or container employed.

Like parts are indicated by like symbols throughout the specification and drawings.

Referring to Figure 1 A generally indicates a vulcanizer casing, herein shown with the ground engaging supporting members $A^1$ and the upward lateral extensions $A^2$ having the interior downward extensions $A^3$ which preferably conform to the outer shape of a tire or casing. $A^4$ diagrammatically indicates an outer tire casing into the hollow of which is inserted the bag B, of rubber or any other suitable material. $A^5$ indicates any suitable clamping means whereby the tire and bag are clamped together against the vulcanizer casing A and between the extensions $A^3$. $A^6$ indicate resistance elements whereby the vulcanizer casing may be heated, and $A^7$ indicates the conductive circuit therefor.

The bag B is shown as having in communication therewith at the opposite ends, the air ducts $B^1$ $B^2$. Referring to the air circuit of which the bag B forms a part C is any suitable fan or blower chamber within which the fan $C^1$ is actuated as by the motor $C^2$. The air is forced by the fan through the passage $C^3$ to the heating element $C^4$, which is described in greater detail below. The heated air passes by the passage $C^5$ to the air inlet $B^1$ and thus through the bag B. The air escaping through the air outlet $B^2$ passes through the duct $C^6$ and thus back to the fan C.

In Figure 6 we illustrate a desirable form of bag B in which the ducts $B^1$ $B^2$ terminate, within the bag, in outwardly flared portions $B^{10}$ in which are the air slots $B^{11}$. Associated with the portions $B^{10}$ are baffles $B^{12}$ which may be connected for example by the intermediate connector or brace $B^{13}$. It will be understood that the construction above described insures a circulation of the air or other heating medium along the outer wall of the bag B.

D indicates an air compressor, the details of which form no part of the present invention. The air supplied by the compressor passes by the passage $D^1$, having the valve $D^2$ to the pressure or diaphragm control valve $D^3$ which is shown as having associated with it the diaphragm $D^4$, the lever $D^5$ and the adjustable counterweight $D^6$. $D^7$ indicates any suitable flap or one way valve, adapted to permit the passage of air from the compressor to the passage $C^6$, and adapted to prevent escape of air in the opposite direction. $D^8$ is any suitable communicating member, herein shown as a T, whereby the connection is obtained between the passage from the air compressor to the passage $C^6$.

Referring more particularly to the heating member generally shown as $C^4$, it is herein shown as including the end member $C^7$ with which communicates the air inlet passage $C^3$. The member $C^7$ is also formed with a projection $C^8$, associated with which is the pop off valve $C^9$, or any suitable pressure release mechanism, adapted to permit the escape of air when the pressure within the closed circuit exceeds a predetermined maximum. $C^{10}$ is the opposite end member of the heating element, the two being connected for example by the pipe $C^{11}$. Extending from the end member $C^{10}$ is the air outlet duct $C^5$. It may also have associated with it any suitable temperature indicating member herein shown as a thermometer $C^{12}$ with the exposed stem $C^{13}$.

Mounted within the pipe $C^{11}$ is a heating member consisting of a central rod E along which are mounted a plurality of discs $E^1$, each disc being provided with a plurality of perforations $E^2$. Passing through these perforations are the resistance coils or wires $E^3$.

In the practice of our invention we find it desirable, in order to maintain an accurate temperature control, to employ two or more resistance elements each of which may include one or more coils.

In the wiring diagram we indicate a primary coil or resistance circuit $E^5$, having the conductive connections $E^6$ $E^7$. The secondary coil or resistance member $E^8$ is provided with the conductive connections $E^9$ $E^{10}$. The main actuating circuit is shown as at $E^{11}$ $E^{12}$. $E^{14}$ indicates any suitable multiple point switch, whereby when the switch is set at the full line position, both resistance circuits are closed, and whereby when it is set at the dotted line position, the main or primary resistance circuit is open.

In order to provide automatic operation we may employ any suitable thermostatic means whereby, when a predetermined temperature has been reached the primary circuit is broken and the secondary circuit may be broken at the same time, or shortly thereafter. Subsequently, the secondary coil is thermostatically cut in or out, in response to temperature fluctuations, whereby the temperature of the heating element is maintained at or about a predetermined norm.

The use and operation of our invention are as follows:

In vulcanizing or treating rubber tires or casings, it is customary to position a casing in an outer mold which must be heated, in case it is the exterior of the tire which is to be vulcanized, and which may be heated when the interior is vulcanized or cured. In the latter case, the most efficient method of applying the heat to the interior of the tire is to deliver it directly to the zone to be heated or treated. In our apparatus and process we employ as a source of interior heat a bag or container which conforms to the interior shape of the casing. The use of such a bag is already known, but the novelty of our process and apparatus consists in heating this bag by circulating hot air therethrough. The process and apparatus may be analyzed as follows: The heating circuit includes the bag itself, a blower, herein shown as a motor driven fan, a heating chamber, and the necessary connecting passages. The air in the circuit is raised to and maintained at a predetermined pressure by the use of any suitable air compressor. This compressor delivers air to the system through a check valve which permits movement of the air only into the system. We also provide, in the admission passage, any suitable means, for example a pressure diaphragm valve, whereby air from the compressor will be admitted to the circuit in response to a drop in the general pressure of the circuit beneath a predetermined minimum pressure. In the operation of the system the compressor is actuated and raises the pressure above the predetermined minimum. The compressor then becomes inoperative and further air is admitted to the system only in order to raise the system pressure to normal, in case it drops below the said predetermined minimum.

Assuming that the pressure in the system is at or above the predetermined minimum, the fan circulates the air within the system and does not itself build up pressure except, of course, the local pressure necessary to overcome the static friction of the system. Thus if the air in the system has to be moved through several feet of pipe, a certain pressure is needed to effect the circulation, and this pressure the fan does supply. In order to reduce it to a minimum, the passages are so shaped and are of such size and proportion as to lighten the work of the fan. Thus passages of relatively large cross-section and with a minimum of sharp turns are preferable.

We do not wish to be limited to any particular type of heater but we herein illustrate a passage along which are spaced porcelain insulating discs with apertures through which pass the heating coils. The air passes through the passage and through the apertures in the discs and through and along the heating coils. Obviously gas or other heating means might be employed, for heating the air or other media, in case electricity is not available or desirable.

In order to govern the temperature in the system we prefer to employ a heating element having two or more separate coils or divisions. By the employment, for example, of a two point switch I may actuate the entire heating element when the device is first set in operation. When the temperature of the heater reaches a predetermined normal, we can then cut out part of the heater. Thus when employing two coils we can initially heat both and then cut out one of them. In the preferred form herein shown we employ a large coil and a small coil, the large coil being cut out after a predetermined temperature is reached. The small coil may be operated continuously, but preferably is employed as a regulator, being thermostatically switched on and off, in response to temperature fluctuations. I prefer to provide thermostatic regulating means whereby the supplemental coil is heated when the temperature drops below the predetermined normal and whereby the circuit is broken when the temperature exceeds the predetermined normal. It will be realized of course that a wide variety of mechanisms may be employed, but we prefer to employ some automatic means whereby the heating device is maintained at or close to a predetermined norm.

In order to protect the system against undue pressure we may employ a pop off valve or any suitable release, whereby an excess pressure is released without damage to the mechanism or to the operator.

The heating bags employed may be of rubber, but are preferably treated to prevent deterioration by the passage of heated air. As shown in Figure 6 the bag is provided with baffles, whereby the circulating medium is directed along the inner face of the wall of the bag.

One great advantage of our method is the possibility of independent control in temperature and pressure. In the system wherein steam is employed as the heating medium a given desired temperature may necessitate a dangerous steam pressure, and an increase in temperature, to heat a given condition, may not only result in an extreme pressure, but may cause an explosion, a destruction of the device and damage or death to an operator. Air has a low specific heat 1.38, and if for any reason hot air is discharged on the system it cools so rapidly on expansion that there can be no damage to the operator. A steam explosion, on the contrary, may result in scalding the operator.

A further advantage of the employment of air in such a circuit is in the elimination of the condensation of water in the bag or in the passages.

We claim:

In an apparatus for applying heat for vulcanization and the like, an inflatable air receptacle adapted to be opposed to the work, a normally closed air circuit in communication with such receptacle, means for raising the pressure of said circuit to a predetermined normal, means for circulating the air in such circuit through said receptacle, including a fan chamber included in said circuit, a fan in said chamber, and means for imparting to it a generally constant rotation.

Signed at Chicago, in the county of Cook and State of Illinois, this 5th day of December, 1927.

WALTER J. JARRATT.
FRANK E. HARTMAN.